United States Patent [19]

Eveleigh

[11] Patent Number: 4,631,205

[45] Date of Patent: Dec. 23, 1986

[54] PROCESS FOR PRODUCING COHERENT FILMS OF POLYACETYLENE

[75] Inventor: John W. Eveleigh, Hockessin, Del.

[73] Assignee: E. I. Du Pont de Nemours and Company, Bartlesville, Mass.

[21] Appl. No.: 659,900

[22] Filed: Oct. 11, 1984

[51] Int. Cl.$^4$ .............................................. C23C 16/00
[52] U.S. Cl. .................................. 427/255.6; 427/255; 427/302; 427/322
[58] Field of Search ................... 427/302, 255.6, 322, 427/255; 525/268, 275; 526/285

[56] References Cited

U.S. PATENT DOCUMENTS

| | | | |
|---|---|---|---|
| 3,092,613 | 6/1963 | Kennerly et al. | 526/285 |
| 3,174,956 | 3/1965 | Luttinger | 526/285 |
| 3,671,604 | 6/1972 | Rutledge | 526/285 |
| 4,241,112 | 12/1980 | Kostundov | 427/302 |
| 4,454,178 | 6/1984 | Naarmann et al. | 427/302 |

Primary Examiner—John D. Smith
Assistant Examiner—Janyce A. Bell

[57] ABSTRACT

A process for producing coherent films of polyactylene is disclosed. A support is contacted with a catalyst comprising an acidic, polar medium containing a transition metal salt, water and a borohydride. The support is then contacted with acetylene gas which forms on the support a coherent film of polyacetylene strongly adherent to the support.

13 Claims, No Drawings

PROCESS FOR PRODUCING COHERENT FILMS OF POLYACETYLENE

TECHNICAL FIELD

This invention relates to a process for making films of polyacetylene having improved coherency, which process optionally can be carried out at about −80° C. without the need for raising the temperature to within the range of about −40° C. to −25° C.

BACKGROUND ART

It is known that acetylene can be polymerized with a catalyst to yield polyacetylene, a structure comprising a chain of carbon atoms connected by alternating single and double bonds with hydrogen atoms in both the cis and trans configurations.

The use of catalysts such as a conventional Ziegler-Natta catalyst, used at relatively low concentrations, leads to the production of an amorphous mass of polyacetylene. Shirakawa et al., described a method for producing coherent films of polyacetylene using the so-called Ziegler-Natta catalyst. [Polymer J., Volume 2, p. 231 (1971)].

Leiser et al., described the use of a modified Luttinger's catalyst to produce coherent films of polyacetylene. [Makromol, Chem. Rapid Commun., Volume 1, p. 621 (1980)]. Twenty milligrams of $NaBH_4$ were dissolved in 50 mL of ethanol and 50 mL diethyl ether were added. The resulting colorless solution was cooled to −80° C., and 1 mL of a 1% by weight solution of $Co(NO_3)_2$ in ethanol was added to form a catalyst solution. A support such as a glass slide was dipped into the catalyst solution and transferred rapidly into an atmosphere of acetylene. These investigators report that as soon as the thin liquid layer of catalyst solution is exposed to acetylene, polymerization commences and the whole slide becomes covered with a coherent layer of cis-polyacetylene within a few seconds of exposure at −30° C.

The polyacetylene films were floated off the glass slide onto a water surface. In the hands of the present inventor, the films produced by this method were not coherent upon drying. The films were fragile gels that crenated badly upon drying. Attempts to wash the gels--necessary to remove catalyst components--prior to drying were disastrous in that the gels broke, were washed off the slide or were completely disrupted.

Monkenbusch et al., describe a similar procedure. These investigators emphasize that polymerization begins as the support is allowed to warm up. [Makromol. Chem. Rapid Commun., Volume 3, p. 69 (1982)].

Edwards et al., report that as the polymerization reaction mixture is allowed to warm up from about −78° C. to about −25° C., the evolution of gas is observed. These investigators presumed that the gas was hydrogen, produced by the decomposition of the borohydride catalyst. [Makromol. Chem. Rapid Commun. Volume 4, p. 393 (1983)].

As reported by Edwards et al., the increase in temperature from about −80° C. to about −30° C., which is required by the prior art to produce coherent films of polyacetylene, causes the production of gas which, in turn, has a serious tendency to disrupt the structural integrity of the polyacetylene films. The prior art suggests no way of raising the temperature in a controlled way to avoid the formation of this disruptive gas.

As would be suggested to those skilled in the art by Edwards et al. who used rigorously dried reagents and who carried out polymerization under a nitrogen atmosphere, it is also important to avoid the presence of water during the polymerization process.

Shirakawa et al. used a catalyst comprising a mixture of titanium tetrabutoxide and triethylaluminium in a solvent. It is known that both of these compounds are extremely reactive with water and oxygen necessitating dry and inert reaction conditions.

Surprisingly, it has been discovered that extremely coherent films of polyacetylene can be produced if the catalyst contains water and an acidic component. Excellent quality coherent films of polyacetylene, strongly adherent to the support on which they are formed, are produced by this novel and unexpected process. In addition, the use of water and an acidic component permits the entire process to be carried out at a single temperature of about −80° C.

DISCLOSURE OF THE INVENTION

Accordingly the present invention is a process for producing coherent films of polyacetylene, comprising contacting at about −80° C. a chemically inert support with an acidic, polar medium comprising a transition metal salt, water and a borohydride to produce a catalytically active surface, and exposing at a temperature within the range of about −80° C. to −20° C. the catalytically active surface to acetylene gas whereby coherent films of polyacetylene adherent to the support are produced. The term coherent denotes a uniform physical consistency throughout the mass of the film, while the term adherent denotes that the entire film mass is strongly attached or adsorbed to the support.

DETAILED DESCRIPTION OF THE INVENTION

Suitable chemically inert supports for practicing the present invention include glass, ceramic, polymer, e.g., polyester film (Mylar ®, Du Pont Co., Wilmington, DE) and metals. The support can be moderately flexible to allow some degree of distortion, even after the polyacetylene film has been deposited without substantially affecting film coherency. This property is advantageous in providing coherent polyacetylene films for applications requiring a non-rigid support, such as flexible electroactive conducting paths. Support materials bearing polyacetylene films may also be exposed to broad ranges of temperature from −90° to 40° C. without significantly affecting film coherency. This temperature change tolerance is in part necessary to the process of this invention because the support is exposed to low temperatures of about −80° C. during film deposition. However, once the film has been deposited, the support is allowed to warm up to room temperature and the film is then dried. Therefore, the chosen support and the film deposited by the process of this invention may be subjected to temperature changes in the stated range without deleterious effects on desirable support or film properties.

The support may also be porous. Suitable materials include filter paper, porous polytetrafluorethylene (Teflon ®, Du Pont Co., Wilmington, DE), nylon mesh, synthetic and natural fabrics. When mesh-like supports are used which are composed of hydrophobic or liquid impermeable materials, the mesh must be capable of trapping liquids within pores or spaces between the mesh strands. This porosity provides the advantage that fluids used as washings, buffers, dopants and the like, can perfuse through the support in a manner similar to that described for polyacetylene/polyethylene copolymers by M. E. Galvin et al. [J. Polymer Science. Volume 21, p. 2727 (1983)]. The support porosity also provides the advantage that when polyacetylene films are appropriately treated, films can be electrically conductive through the body of the support as well as along the support length.

The polar media necessary to the practice of this invention must have several features. They must be in the liquid state at about $-80°$ C.; water must be miscible with the polar media; catalysts selected for use in the invention process must be solubilized by the media; and the polar media must not be themselves reactive with the chosen catalysts. The polar media are believed merely to provide a vehicle for the components that comprise the active catalyst solution. It is also believed that the chemical species of the polar media do not directly react with any components of the active catalyst solution, and in this regard, the exact chemical species of the polar medium is not critical. Suitable polar media include lower alkanols such as methanol, ethanol, propanol, and butanol, as well as acetone and cyclohexanones.

It has been found that acetylene polymerized more slowly and with some irregularity under a blanket of carbon dioxide in the absence of added acid. However, it is preferred that a suitable acid is added to the chosen polar medium to provide a pH less than or equal to about 5. This acidification provides acceleration of the acetylene polymerization process such that film deposition occurs in 20 seconds or less, with greatly improved reproducibility and coherency. Suitable acids include hydrochloric, hydriodic, hydrobromic, and acetic acid.

The transition metal salts of iron, cobalt, nickel, paladium, platinum, and ruthenium are believed capable of functioning as a component of the active catalyst solution. The preferred transition metal salts are divalent cobalt ionizing salts such as $Co(NO_3)_2$, $CoCl_2$ and $CoSO_4$. One criterion for selection of an appropriate transition metal salt is that is must be soluble in the polar media of the active catalyst solution.

Suitable borohydrides can be inorganic or organic, and include without limitation sodium borohydride and N,N,N,N-tetra-butylammonium borohydride.

An active catalyst solution is prepared by mixing two relatively stable component solutions prior to use. The component solutions must be precooled to $-80°$ C., mixed, stored and used at this temperature.

The first component solution is a transition metal salt dissolved in ethanol or other suitable polar solvent containing a defined amount of water and acid. The divalent cobalt ion-producing salts are preferred. The concentration of the cobalt salt, preferably the nitrate, sulphate or chloride should be about 10 mg/mL. The amount of water in the solvent should be between 1% to 10% by volume; optimally 2.5% is preferred. The amount of glacial acetic acid, or alternatively 0.1N hydrochloric acid, is a function of the water content. With 2.5% water, the acceptable range is 0.1% to 2.5% by volume; optimally 0.5% is preferred. The higher range of acid component (2.5%) results in polyacetylene films of variable quality depending upon technique. The ratio of water to added acid should preferably be within the range of 5:1 to 10:1. This solution is stable indefinitely at room temperature in the presence or absence of oxygen.

It is believed that the contributions of water to the novel process are to promote more complete ionization of the transition metal salts and suitable organic borohydrides, and to provide optimal surface tensions on appropriate supports to promote greater polymerized film coherency.

The second component is an ethanol solution (or another suitable solvent, but preferably the same as that used in the first component) of a borohydride. Preferably, tetra-N-butylammonium borohydride (TBAB) is used at a concentration of 50 mg/mL. Alternatively, sodium borohydride can be used, however, the final concentration is reduced to about 10 mg/mL for stoichiometric considerations. This solution is stable for approximately 8 hours at $-80°$ C. and for approximately 1 hour at room temperature.

Prior to use for the polymerization of acetylene, precooled component solutions are mixed in equal proportions. There is no evidence to suggest that the order of mixing is important. The active catalyst solution is stable at $-80°$ C. for at least one hour, however, for optimal results it should be used between 1 and 10 minutes after mixing.

The preferred method for obtaining adherent and coherent films of polymers with no imperfections is to coat the chemically inert support, precooled to $-80°$ C. (supported on solid $CO_2$ containing vessel) with a thin layer of active catalyst to produce a catalytically active surface and then expose the surface to acetylene gas. The exposure can be at any temperature from about $-80°$ C. to about $-20°$ C., although for convenience the temperature can be maintained at a continuous $-80°$ C. This should be contrasted with methods of the prior art which require raising the temperature to about $-30°$ C. Application of the catalyst solution can be by spraying or brushing; the final quality of the film depends critically upon an even coherent layer of catalyst solution. The catalyst solution can be applied in a continuous layer over the support surface, or in any regulated, desired pattern in which catalyst is excluded from selected support areas by one or more known means, such as hydrophobic/hydrophilic boundary processes, screen printing, etc. The surface of the chemically inert support which will be coated with a continuous layer of polyacetylene must be clean in order to prevent voids and uneven coating. Suitable degreasing solvents for cleaning supports include ethanol. Freon ® TF, isopropanol and acetone. The acetylene gas does not have to be dried or purified prior to use to obtain coherent, useful films. The presence of oxygen, acetone, carbon dioxide, or other contaminants present in commercial grades of acetylene gas is not detrimental to polymer production.

Depending upon the subsequent use of the polyacetylene, the film can be washed in situ by immersion in or flushing with suitable solvents to remove catalyst components. Suitable solvents such as dilute acid in water or acidified alcohols are selected to provide both low surface tension and solubility of spent catalytic byproducts. Drying of the film in dried, ambient air or a nitrogen atmosphere after preparation is preferred prior to such washings. The drying process evaporates alcohols and other polar solvents that might be sequestered between the polymerized continuous acetylene film and the support. Assuring the removal of these isolated solvent reservoirs encourages film adherency to the support during the wash procedures. It is preferred that drying not be done above room temperature to avoid catalyst decomposition prior to washing. However, after the films have been dried, they may be subjected to elevated temperatures to promote isomerization to a trans configuration. It is known that these so-called all-trans polyacetylene films are preferred for electrical conduction, since they appear more susceptible to appropriate doping than the cis and cis-trans configurations.

Storage of polyacetylene films should be in a dry air or preferably dry nitrogen atmosphere to optimize their stability to oxidation.

Scanning electron microscopic examination of polymerized films has revealed coherent layers typically up to about 5 microns thick. Moreover, the layer coherency is maintained on the support out to the periphery of polymerization until single polyacetylene fibers can be seen.

EXAMPLE

A solution of cobaltous nitrate ($Co[NO_3] \cdot 6H_2O$) is prepared by dissolving 1 g in 100 mL of ethyl alcohol. To this solution is added 2.5 mL of distilled water and 0.5 mL of glacial acetic acid. A solution of tetra-N-butylammonium borohydride (98% pure; Chemalog Corporation) is prepared by adding 5 g to 100 mL of ethyl alcohol.

Equal tubed aliquots of 2 mL are cooled to $-80°$ C. by immersion in solid $CO_2$ pellets for about 2 minutes. These aliquots are then combined in a single tube and mixed by gentle agitation to give an even purple coloration. The catalyst solution is stored temporarily in the solid $CO_2$ bath. The coloration may disappear during storage, but the catalyst remains active.

A precleaned glass microscope slide is placed on the upper surface of an inverted dish containing solid $CO_2$ pellets and allowed to cool. Excessive humidity should be avoided to prevent frost accumulation on the slide. The catalyst solution is coated on the upper surface of the slide by use of an artist's camel-haired brush using even strokes until a continuous film is obtained. A stream of acetylene gas, obtained directly from a cylinder, is directed at the coated surface by means of a tube and/or an inverted funnel. The surface becomes immediately covered with a brownish-black gel-like layer of polyacetylene. The gas stream is terminated when the surface is completely covered with polymer.

The microscope slide is removed and dried under a flowing stream of dry air or nitrogen. It is washed by sequential immersion in alcohol, acidified alcohol, dilute acid and water and then subsequently dried for future use or study.

I claim:

1. A process for producing coherent films of polyacetylene, comprising:
contacting at about $-80°$ C. a chemically inert support with an acidic, active catalyst solution having a pH of 5 or below comprising a transition metal salt, polar medium, water and a borohydride to produce a catalytically active surface; and exposing at a temperature from about $-80°$ C. to about $-20°$ C. the catalytically active surface to acetylene gas whereby coherent films of polyacetylene adherent to the support are produced.

2. The process of claim 1 wherein the exposure of the catalytically active surface to acetylene gas is carried out at about $-80°$ C.

3. The process of claim 1 wherein the polar medium is selected from the group consisting of lower alkanols, acetone and cyclohexanones.

4. The process of claim 3 wherein the lower alkanols are selected from the group consisting of methanol, ethanol, propanol, and butanol.

5. The process of claim 1 wherein the acidity of the active catalyst solution is provided by an acid selected from the group consisting of hydrochloric, hydriodic, hydrobromic and acetic acid.

6. The process of claim 5 wherein the acid is hydrochloric or acetic acid.

7. The process of claim 1 wherein the water is used at a concentration from about 1% to about 10% by volume of the polar medium.

8. The process of claim 7 wherein the water is used at about 2.5% by volume.

9. The process of claim 8 wherein the medium is made acidic by 0.1N hydrochloric acid or glacial acetic acid within the range of about 0.1% to 2.5% by volume.

10. The process of claim 9 wherein the acid is used at about 0.5% by volume.

11. The process of claim 1 wherein the organic borohydride is sodium borohydride or N,N,N,N-tetrabutylammonium borohydride.

12. The process of claim 1 wherein the transition metal salt is a salt of iron, cobalt, nickel, palladium, platinum, and ruthenium.

13. The process of claim 12 wherein the salt is selected from the group consisting of $Co(NO_3)_2$, $CoCl_2$ and $CoSO_4$.

* * * * *